(12) United States Patent
Falgout, Sr.

(10) Patent No.: US 6,569,020 B1
(45) Date of Patent: May 27, 2003

(54) MOTOR COUPLER

(76) Inventor: Thomas E. Falgout, Sr., 110 Charles Read St., Lafayette, LA (US) 70503

( * ) Notice: Subject to any disclaimer, the term of this patent is extended or adjusted under 35 U.S.C. 154(b) by 0 days.

(21) Appl. No.: 10/087,504

(22) Filed: Mar. 1, 2002

(51) Int. Cl.$^7$ ................................................ F16D 3/44
(52) U.S. Cl. ........................................... 464/157; 464/7
(58) Field of Search ................................ 464/7, 18, 19, 464/150, 157; 403/364; 175/74, 89, 320

(56) References Cited

U.S. PATENT DOCUMENTS

| | | | |
|---|---|---|---|
| 2,608,840 A | * 9/1952 | Lahaie | 464/7 |
| 3,320,771 A | * 5/1967 | Roethlisberger et al. | 464/157 X |
| 4,391,547 A | * 7/1983 | Jackson, Jr. et al. | 464/157 X |
| 4,928,776 A | * 5/1990 | Falgout, Sr. | 175/74 X |
| 5,205,789 A | * 4/1993 | Falgout, Sr. | 464/157 |
| 5,651,737 A | * 7/1997 | Le Blanc | 464/157 |
| 6,203,435 B1 | * 3/2001 | Falgout, Sr. | 464/18 |

* cited by examiner

Primary Examiner—Greg Binda
(74) Attorney, Agent, or Firm—John D. Jeter

(57) ABSTRACT

A flexible coupling has two spherical surfaces in rubbing contact to carry thrust, both surfaces having a common center of surface development each surface on an opposed coupling half, each coupling half having jaws extending toward the other half in an interdigitating relationship to conduct torque between the two halves, one half having a rigidly attached sleeve extending to position and support a peripheral seal for fluid tight contact with a peripheral surface on the other half to provide a fluid tight enclosure for the rubbing spherical surfaces and the surfaces of the jaws.

A variable volume enclosure is provided as a lubricant reservoir and hydrostatic compensator to feed lubricant to the enclosed spherical surfaces and the surfaces of the jaws.

A connecting arrangement having two flexible couplings axially separated by a connecting shaft to couple a motor rotor and motor output shaft has at least one lubricant providing reservoir arranged to provide hydrostatic compensation for the enclosed volumes of the couplings.

8 Claims, 3 Drawing Sheets

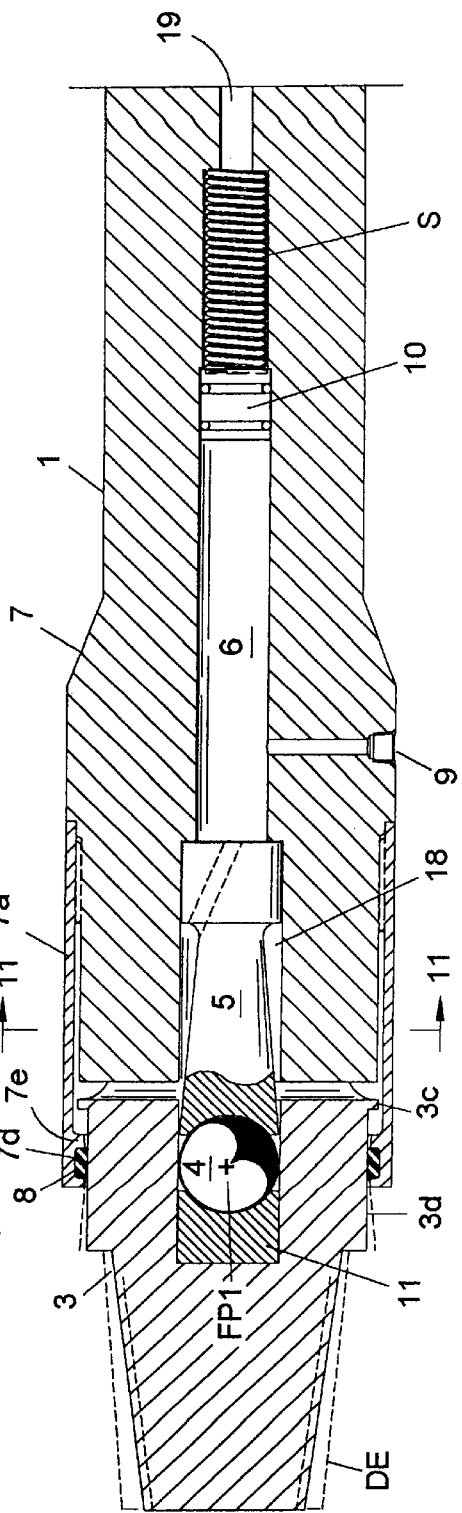
FIG. 1 (AMENDED)
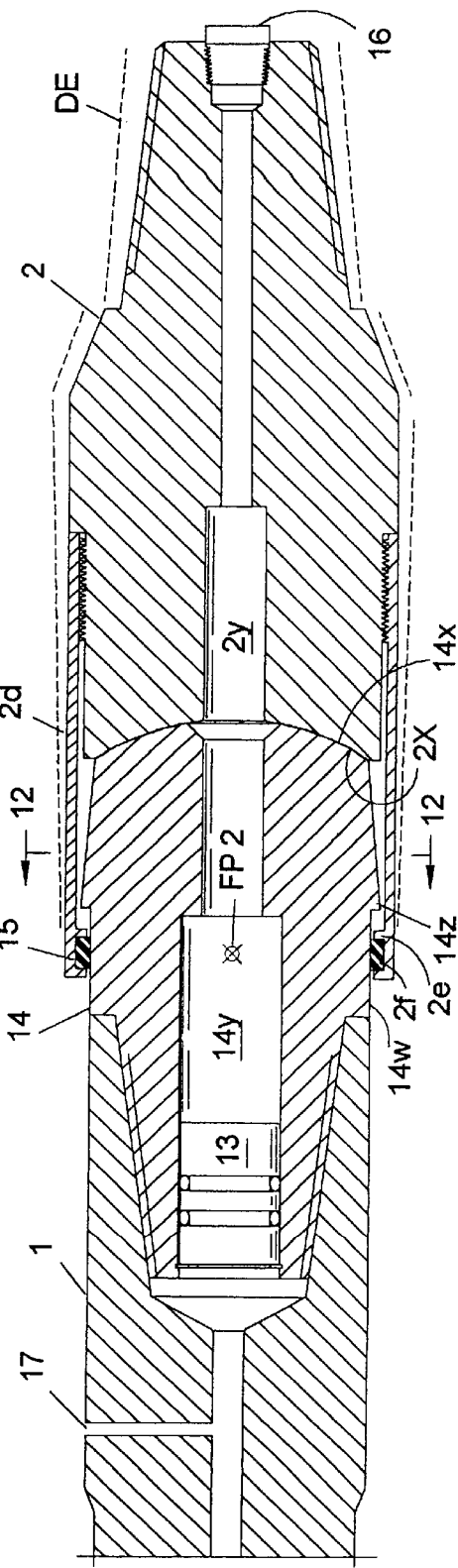
FIG. 2 (AMENDED)

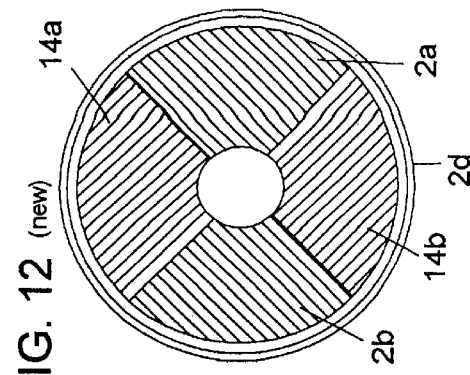
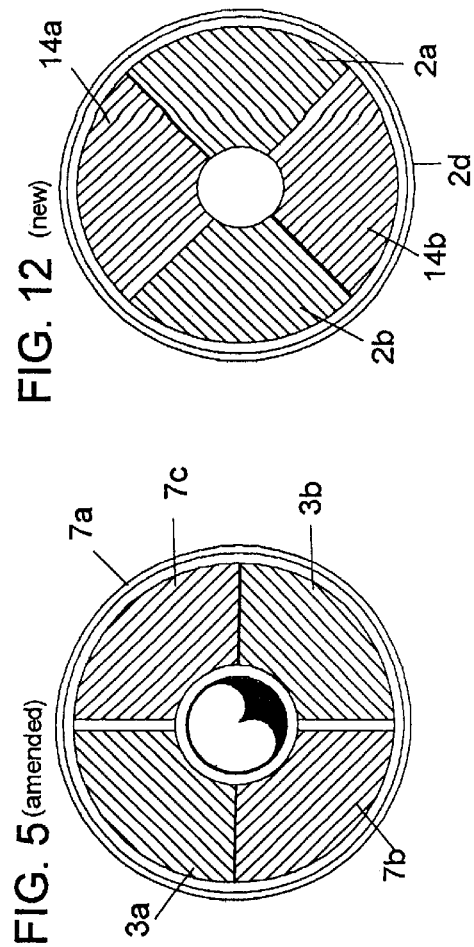
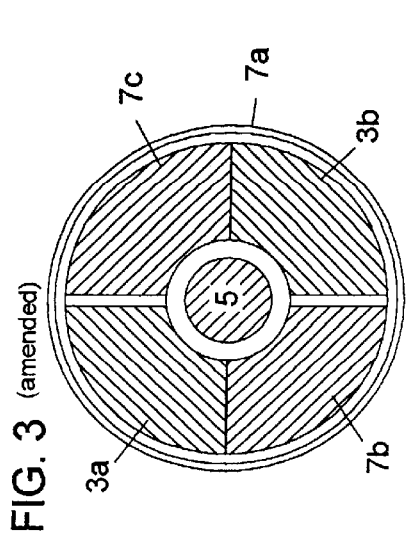
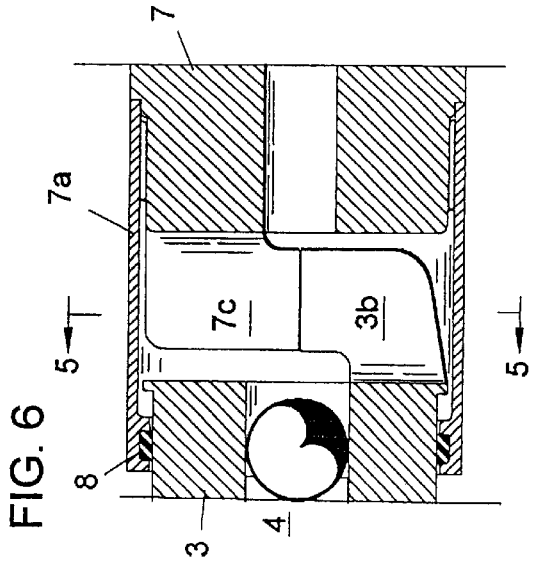
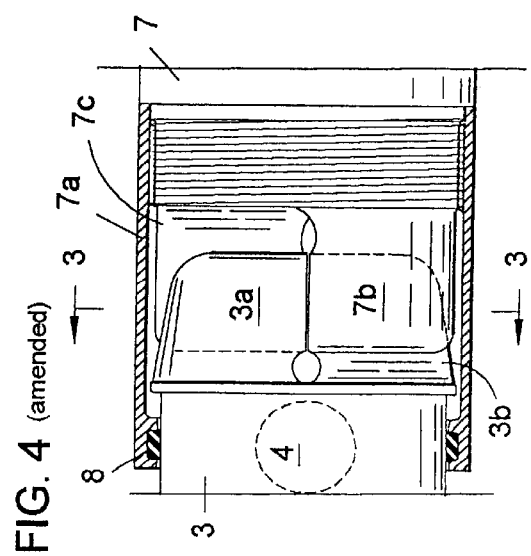

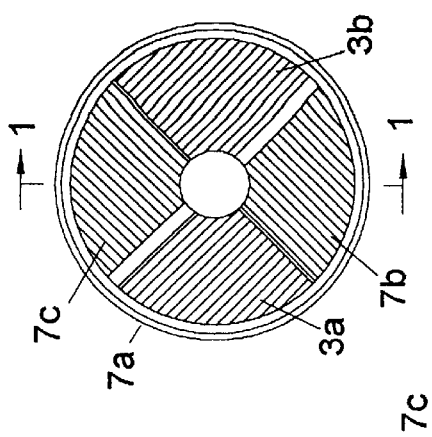
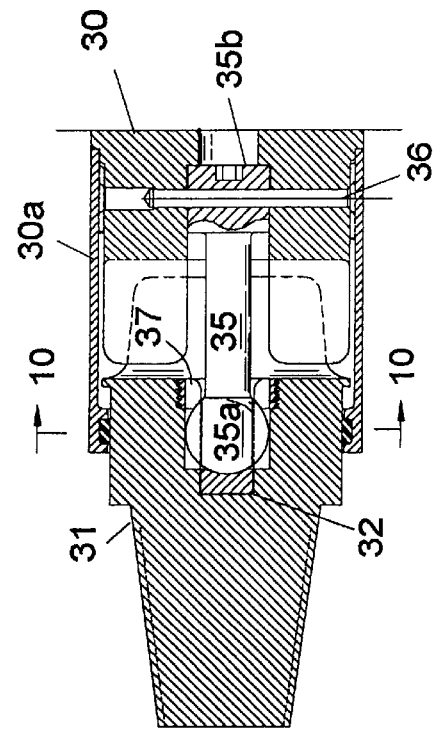
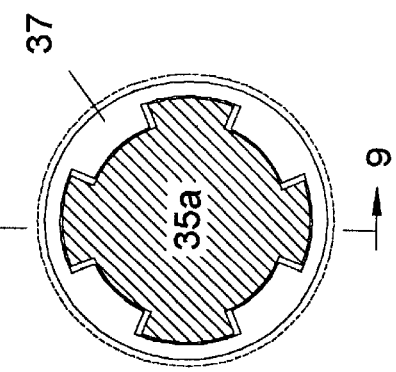
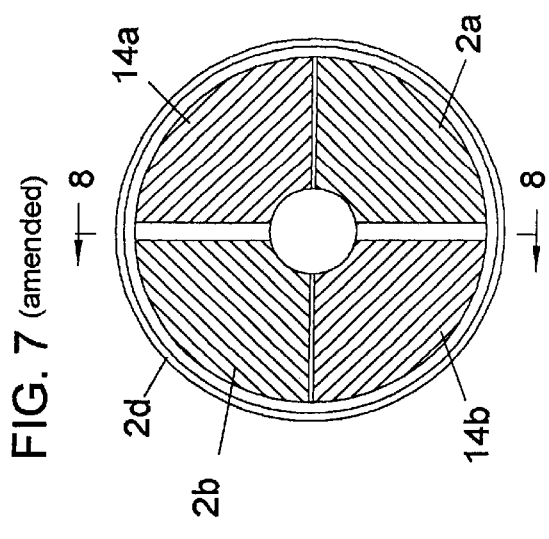
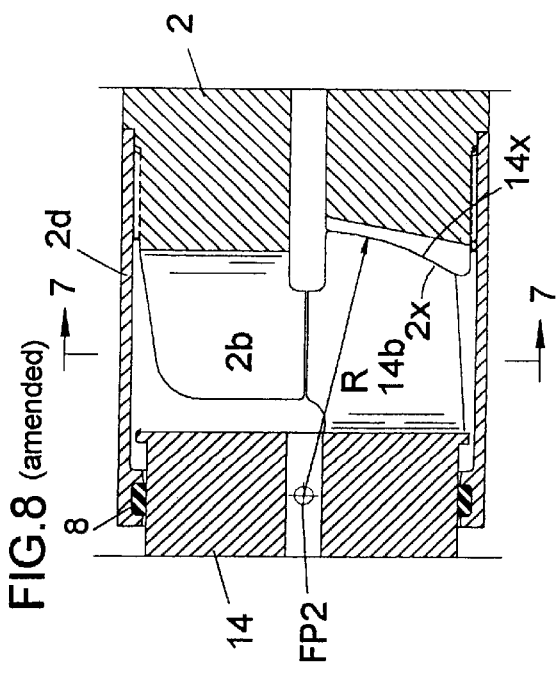

MOTOR COUPLER

This invention pertains to couplers usable within drilling motors. More specifically it pertains to couplers for use down hole in well drilling to couple the power producing part of the drilling motor to the output shaft. The coupler can be used within directional drilling turbodrills or electrodrills, and it is especially beneficial in positive displacement mud powered drilling motors.

BACKGROUND

In recent years, down hole motor failures have often been caused by the flexible connectors intrinsic to the motors. Motors used in well drilling are necessarily slender in order to move down the well bore. The slender motor can be quite long and can develop substantial torque. The torque may overload internal shafts if the shafts are flexible. A drilling motor for directional drilling usually has a flexible shaft, either to negotiate a bent motor body or to accept power from progressing cavity motor rotors. Progressive cavity motor rotors do not rotate around a stable centerline, they orbit the general centerline and are connected to the stable output shaft by flexible couplers.

Efforts to use ordinary couplings such as the universal joints found on truck drive shafts have met with little success because of the lubrication problem inherent in mud filled motors. Couplers of many forms have been used with reasonable success, but they have been the weak link in the system. Efforts to lubricate the couplings have taken many forms with limited success. Usually, the life of the sealed coupling have been only slightly longer than the life of the lubricant sealing system.

On the progressing cavity drilling motor, the coupling shaft is in compression while drilling proceeds but the shaft can be in tension when the drilling motor is being lowered into the well. The tension load is not great but it does place demands upon the design.

The compression load is not a major problem and simple ball elements have been used to carry the compressive load and keep the flexure point, or points, of the connector stable.

Sealing means to contain lubricant have evolved through many forms. A flexible elastomer sleeve clamped peripherally above and below the coupling showed promise but they too often get punctured and cause early failures in the down hole drilling assembly. The cost of tripping the drill string to replace a component is very high and demands for reliability have reflected the cost.

There is a dire need to avoid the vulnerability of elastomer sleeves, yet provide a coupling that is of such configuration that it has as much expectable run time in mud as the currently used mud bathed systems. By that process, the prospect of long duration run times down hole is not offset by the prospect of sudden failure when the lubricant seals do fail.

SUMMARY OF THE DISCLOSURE

The couplers disclosed have stable flexure points and, individually, may serve connected shafts with rotational axes that cross. To connect shafts with rotational axes that do not cross, two couplers are used and separated by a connecting member having a selected length. The connecting member can serve as a housing for lubricant for either or both couplers. The connecting member can also serve as part of either or both couplers.

The preferred coupling has facing half-couplings, each half-coupling having axially extending jaws peripherally spaced such that the opposing half-couplings can be axially moved together until the jaws interdigitate.

A flexible coupling usable down hole on motors needs stable axes of rotation. Spherical surface pairs, convex and concave in sliding relationship, force flexure to take place at the center of development of the spherical surfaces. One version of the coupling employs a ball, mounted on one half-coupling in rubbing contact with a mating concave surface mounted on the opposing half-coupling. Another version has mating spherical surfaces in broken patches, convex at the end of the jaws on one half-coupling mating with concave patches of spherical surfaces at the place where the end of the convex jaw surfaces rub on the opposing half coupling. In any case, the point of flexure, where the coupled rotational axes cross, is at the center of development of the mating spherical surfaces.

The flexure point being established, the sealing arrangement to keep lubricant inside and mud outside involves a sleeve rigidly attached to one coupling member with a sealing ring situated on the extended portion of the sleeve to extend around the periphery of the mating coupling in a transverse plane containing the point of flexure. The sealing ring then experiences little radial displacement when the coupling flexes. The flexing is normally limited to less than five degrees, and usually about three degrees. With limited flexure, the surfaces on the sleeve that confines the sealing ring needs to clear the peripheral surfaces rubbed by the seal only a small amount. The needed clearances are compatible with the clearances normally required to confine the seal in the presence of the limited pressure differences across the sealing ring. The peripherally extending sealing element mounted in the sleeve sealingly secured on one half-coupling slides, or rubs, on a peripherally extending surface of the other half-coupling to form a fluid tight closure.

The occasional tension tending to separate the jaw coupling is contained by an interfering ring, or flange, on the jaw coupling portion not attached to the sleeve. The interfering ring is opposed by an inwardly extending flange within the sleeve near, or part of, the seal confining, peripherally extending, structure on the sleeve. Very little rotation of the coupling occurs when the coupling is in tension. The motor is not normally delivering power when the coupling is in tension.

It is normally the nature of the motor to provide compressive loads on the coupling when the motor is delivering power. The compressive load transmitted through the coupling causes the cooperating spherical surfaces to stabilize the flexure point of the coupling.

For use on progressing cavity positive displacement motors, two axially separated couplers are used to provide two points of flexure to permit the motor rotor centerline to orbit an extended centerline of the output shaft being driven.

The closed volumes of the sealed coupling are fluidly connected to variable volume chambers having an ambient fluid reference side to provide hydrostatic compensation and to provide make-up fluid to replace any leakage from the coupling seals. Axially moving sealed pistons are preferred. A sliding piston separating oil and mud, movable along a bore may comprise a hydrostatic compensator. The hydrostatic compensator tends to equalize pressure inside a sealed enclosure and the ambient pressure outside. Such compensators are widely used in sealed, drilling related, assemblies used in wells. They are well understood by those skilled in the art of drilling related machine design.

An optional ball mounting feature uses the ball to limit axial separation of the coupling to supplement the ability of the sleeve to prevent coupling separation.

It is an object of the invention to provide a stable point of flexure to provide radial stability to the seal to reliably seal the lubricant containing feature of the coupling.

It is another object of the invention to provide means to prevent separation of the coupling by means intrinsic to positioning and confining the sealing element.

It is yet another object to provide lubricant reservoir means to feed lubricant to the rubbing surfaces of the coupling and to provide hydrostatic compensation for sealed volumes in the coupling.

These and other objects, advantages, and features of this invention will be apparent to those skilled in the art from a consideration of this specification, including the attached claims and appended drawings

BRIEF DESCRIPTION OF DRAWINGS

FIG. 1 is a side view, mostly in cut-away, of a motor coupling utilizing the surfaces of a ball.

FIG. 2 is a side view, mostly in cut-away, of a motor coupling utilizing machined spherical surfaces of the clutch jaw related elements.

FIG. 3 is a sectional view taken along line 3—3 of FIG. 4.

FIG. 4 is a side view, of a selected area of FIG. 1, with the sleeve only being cut away to show clutch jaw relationships.

FIG. 5 is a sectional view taken along line 5—5 of FIG. 6.

FIG. 6 is a sectional view similar to that if FIG. 4 with most features in cut-away.

FIG. 7 is a sectional view, in cut-away, taken along line 7—7 of FIG. 8.

FIG. 8 is a fragmented side view, in cut-away (along line 8—8 of FIG. 7) of a selected area of the coupler of FIG. 2, with the jaw structure providing the spherical surfaces.

FIG. 9 is a side view, mostly in cut-away of an alternate use of a ball containing structure similar to the coupling of FIG. 1.

FIG. 10 is a sectional view taken along line 10—10 of FIG. 9 and limited to the ball confining features of the coupling of FIG. 9.

FIG. 11 is a sectional view, taken along line 11, of FIG. 1.

FIG. 12 is a sectional view taken along line 12—12 of FIG. 2.

DETAILED DESCRIPTION OF DRAWINGS

The jaws, in some cases, serve both as torque transmission means and have spherical surfaces for axial stability and are shown in section views with two different rotational relationships. They may be best understood if FIG. 1 is first referred to FIG. 11. FIG. 11 is rotated forty-five degrees and shown as FIG. 3 which is a section taken along line 3—3 of FIG. 4 which is a selected area of the coupling of FIG. 1 after it is rotated a quarter turn about it's axis of rotation. FIG. 6 is from the same area as FIG. 4 but heads 3 and 7 are cut away rather than just the sleeve 7a.

FIG. 2 can be best understood by referring to FIG. 12. Note that FIG. 2 is cut through jaws 14a and 14b. Refer then to FIG. 7 which is the same as FIG. 12 rotated forty-five degrees about the coupler axis.

FIGS. 1 and 2 present two preferred coupler configurations, that make up a two flexure point shaft connector, axially spaced and rigidly connected. Each coupler can be used independently, or either configuration can be used on both ends of the assembly. The rigid coupler spacing element can be configured to comprise one clutch member (called a half-coupling) on one end or both ends. The choice of construction usually is related to the size of the motor to be served, in light of the need to minimize expendable element cost. Each end of the overall assembly is arranged with means for attachment to continuing elements of the motor to be served. Common tool joint couplings are often used as internal motor threaded connectors and the pin end is shown. The range of flexure, or deflection, envelopes for the couplings of FIGS. 1 and 2 are shown in dashed lines and captioned DE Couplers of the jaw-clutch type are referred to as having two opposing halves. The term half refers to function and not to relative mass or dimension. That convention is observed herein.

FIG. 1 shows a coupler having a ball 4 providing a spherical surface to establish a point of flexure stability. Flexure control, sealing, and the lubricant reservoir will be described in this figure and details of the coupler jaws will be described later with the benefit of sections in a different plane. Shaft 1 has the configuration of coupler head 7 intrinsic to the left end. A coupling half comprises a coupler head and intrinsic axially extending jaws.

Piston 10 slides in bore 6 to provide a variable volume enclosure for lubricant. Sleeve 7a is rigidly connected to head 7 and comprises a fluid tight enclosure extending from piston 10 to seal 8. Seal 8 is in a peripheral groove 7d around the inner periphery of the flange 7e on sleeve 7a. Seal 8, in contact with the cooperation rubbed surface 3d, comprises a closure for the general enclosure. The piston configuration comprises a variable volume enclosure and invites the use of a spring S behind the piston to put a positive inside pressure drop across the sealing element 8. In a high pressure environment, especially in mud, seals are prone to some slight leakage. It is better for the oil to seep and clean the interstices of the seal. The spring is optional. Lubricant is installed through port 9, which is then plugged. Ambient reference pressure is delivered through port 17 by way of channel 19.

The sliding piston 10 separating oil in the general enclosure and mud communicated to the ambient region by way of channel 19, movable axially in sealing contact with the surface of bore 6, has an oil side and a mud side and comprises a hydrostatic compensator. The hydrostatic compensator tends to equalize pressure inside a sealed enclosure and the ambient pressure outside.

Pedestal 5 with a concave spherical seat, stands in bore 18 to engage ball 4 to cause the rotational centerline of shaft 1 to pass through the center of the ball. Ball 4 is supported in an expendable seat 11 which is rigidly supported in coupler half 3 to cause the rotational axis of head 3 to pass through the center of the ball. Ball 4 provides a convex surface to engage concave surfaces on pedestal 5. Rigidly mounted thereon, ball 4 becomes part of half-coupling 3. Rigidly mounted pedestal 5 and it's concave bearing surface becomes part of coupler head 7. The flexure points FP1 and FP2, are centers of development of related contacting spherical surfaces in this figure, and they are coincident with the rotational axes of both ends of the related coupling.

Seal 8 is situated near or on a transverse plane which contains the center of the ball 4. When the coupling rotates, when deflected, the rubbed surface 3d, of coupling half 3, opposing the seal, causes very little change in the radial compression of the seal. Flexure of the coupling, under such circumstance, does not appear to challenge the reliability of the seal.

Outwardly projecting flange 3c, in conjunction with inwardly projecting flange 7e prevents the separation of the coupling. Flange 3c is of larger diameter than the inner diameter of flange 7e.

FIG. 2 is shown as part of a two flexure point connecting shaft assembly. In the presence of large hydrostatic heads and intense vibration, large spherical mating surfaces have little effective sliding friction and resist mating surface separation that axial vibration tends to promote. The coupling flexes about point FP2 and behaves much as that described for the ball version of FIG. 1. Seal 15 is situated by sleeve 2d in peripheral groove 2f in inner flange 2e in the same general plane as point FP2 and seals against surface 14w with the same effect as previously described relative to the ball 4.

Lubrication is installed by way of channel 2y through lubricant fill adapter 16 and pushes piston 13 along bore 14y. Piston 13 may be spring loaded by a spring extending into a bore in shaft 1 (none shown). A tool joint connection is shown between head (coupling half) 14 and shaft 1. The head 14 can be machined intrinsic to shaft 1. The coupling comprising coupling halves 2 and 14 can function as the sole flexible coupling in an installation suitably served by one flexure point.

Separation of the coupling is prevented by inwardly extending flange 2e and the somewhat larger flange 14z.

Concave surface 2x is on coupling half 2 and engages convex surfaces 14x on the end of jaws 14a and 14b on coupling half 14 to cause the flexure point of the coupling to be at point FP2.

FIGS. 3, 4, 5, and 6 relate to a length of the coupling of FIG. 1 cut long enough to include jaws, spherical surfaces and sealing arrangements. All similar captions relate to the same features.

FIG. 3, a section from FIG. 4, is situated such that a plane containing line 4—4 cutting only sleeve 7a shows the rubbing surfaces of jaws 7b and 3a in FIG. 4 that transmit torque. The coupling drives in clockwise rotation. No separate seal is usually needed between sleeve 7a and head 7 because they are tightly torque together by threads.

FIG. 5, a section of FIG. 6, is similar to FIG. 3 but both heads 3 and 7 are sectioned along line 6—6. Ball 4 is in position but ball engaging elements are omitted to show engagement of jaws 3b and 7c in FIG. 6.

The jaws are shown to have flat surfaces in engagement. The engaging surfaces of the jaws usually have a slight curvature to accept deflection without creating vibration when rotating in a deflected state.

FIGS. 7 and 8 relate to a length of the coupling of FIG. 2, selected to show the nature of the surfaces that create the flexure point FP2.

FIG. 7 is a section taken through the coupling of FIG. 8. Axially projecting jaws 2a and 2b interdigitate with jaws 14a and 14b. This section is much the same as FIG. 11 but rotated forty-five degrees, about the coupling rotational axis, to provide an uncut view of jaws 2b and 14b in FIG. 8.

In FIG. 8, radius R applies to both surfaces 2x and 14x. A comparable pair of rubbing surfaces are not shown but are diametrically across the rotational axis and involve jaw 14a and a mating concave surface on head 2. Note that there are no spherical surfaces on jaws 2a and 2b. Surface 2x is on the end of the quadrant milled out of head 2 to accept the jaw 14b.

FIG. 9 is the arrangement of FIGS. 1 and 4 with an added security of capturing the ball to prevent surface separation between the ball and the cooperating concave surface. The equivalent of ball 4 and element 5 are machined in one piece 35. Seat 32 functions the same as seat 11. Ball end 35a is scalloped to pass through retainer 37 cutouts as shown in FIG. 10. Element 35 is then rotated forty-five degrees by way of a wrench socket in base 35b. Pin 36 is then inserted through a crossbore in head 30 to lock the coupling together. Note that ball 35a is shown before rotation in FIGS. 9 and 10, and base 35b is shown after rotation in FIG. 9. Retainer 37, having a ball mating concave surface does not need the clearance for flexure seen for the sleeve 30a and head 31 interference surfaces. Vibration induced bounce of the ball from the seat is prevented. This arrangement may otherwise be identical to the coupler of FIG. 1.

FIG. 11 shows the relationship of jaws and cutting plane used to produce the cut-away views of FIG. 1.

From the foregoing, it will be seen that this invention is one well adapted to attain all of the ends and objects hereinabove set forth, together with other advantages which are obvious and which are inherent to the tool.

It will be understood that certain features and subcombinations are of utility and may be employed without reference to other features and sub-combinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

What is claimed is:

1. A drilling motor flexible coupling apparatus for connecting internal parts of a down hole drilling motor, the apparatus comprising:

a) an assembly of two opposed half-couplers, each half-coupler having a rotational axis, the two resulting axes of rotation crossing at a center of development of spherical surfaces, said surfaces, one concave and one convex, situated one surface on each half, and engaging the other in rubbing contact, each half-coupler with jaws extending toward the other for an interdigitating relationship to rotationally couple the two half-couplers;

b) a cylindrical sleeve sealingly and rigidly attached to one said half-coupler and extending to place a seal containing a peripheral groove opening radially inward to place the contained seal in rubbing contact with a surface on the other half-coupling, the seal positioned generally in a transverse plane that contains the center of development of the spherical surfaces;

c) axial constraining means, to prevent separation of the two half couplings, comprising an inwardly extending flange on the sleeve and an outwardly extending flange on the half-coupling in said rubbing contact with the seal, the outwardly extending flange being of larger diameter than the inner diameter of said inwardly extending flange;

d) said seal extending peripherally around the inwardly opening groove in the sleeve; and e) a lubricant reservoir in fluid communication with the surfaces defining the jaws and the inner surface of the sleeve, the reservoir being a variable volume enclosure arranged to function as a hydrostatic compensator having a fluid separator with a mud side and a lubricant side, the mud side arranged with channel means to fluidly communicate with the ambient region outside the sleeve.

2. The coupling apparatus of claim 1 wherein said fluid separator comprises a piston arranged to move in sealing contact with a surface in one of the half-couplings of the coupling assembly.

3. The coupling apparatus of claim 1 wherein one of said spherical surfaces is on a ball supported in one of the half couplings, the point of flexure of the coupling being the center of the ball.

4. The coupling apparatus of claim 1 wherein one of said spherical surfaces comprises the terminal surfaces on the jaws of one of said half-couplings and the cooperating spherical surface is intrinsic to the other, both said surfaces having the same center of development.

5. The coupling apparatus of claim 2 wherein a spring is provided and situated to urge said piston to move to place the lubricant side of the piston at a higher pressure than the mud side.

6. A flexible connecting apparatus for use in connecting an output shaft and a power generating rotor shaft of a down hole motor on a drill string in a well arranged to provide two axially separated points of flexure, each point of flexure being established by a flexible coupling, both said couplings joined by a connecting shaft, the flexible connecting apparatus comprising:

a) a first flexible coupling attached to said output shaft and said connecting shaft and comprising two cooperating first spherical surfaces, both spherical surfaces having a common center of surface development, the first flexible coupling comprising two opposed first half-couplings rotationally coupled by first interdigitating jaws attached to and extending from each first half-coupling toward the other, the jaws and the spherical surfaces being sealingly enclosed by a first sleeve rigidly attached to one said first half-coupling and extending to position and support a first closure seal engaging a first cooperating rubbing surface on the other first half-coupling;

b) a second flexible coupling attached to said power producing rotor shaft and said connecting shaft and comprising two opposed second half-couplings and bearingly cooperating second spherical surfaces, one said second spherical surface on each said second half-coupling both said second spherical surfaces having a common center of surface development, the second flexible coupling comprising said two opposed second half-couplings rotationally coupled by second interdigitating jaws extending from each said second half-coupling toward the other, the second interdigitating jaws and the second spherical surfaces being sealingly enclosed by a second sleeve rigidly attached to one second half-coupling and extending to position and support a second closure seal engaging a second cooperating rubbing surface on the other; and c) at least one lubricant reservoir arranged to provide lubricant to all said spherical surfaces and surfaces defining all said jaws.

7. The flexible connecting apparatus of claim 6 wherein said at least one lubricant reservoir comprises a variable volume enclosure comprising a movable separating means with two sides, a first side fluidly communicated to all said spherical surfaces and the surfaces defining all said jaws, the second side fluidly communicated to the ambient region outside both said sleeves.

8. The flexible connecting apparatus of claim 7 wherein said movable separating means is spring biased to provide a pressure difference across said movable separating means with the higher pressure on said first side.

* * * * *